Aug. 12, 1969 R. M. HICKS ETAL 3,460,675
SEPTIC TANK INSPECTION APPARATUS AND PROCESS
Filed June 12, 1967

INVENTORS
Henry A. Anderson
Robert M. Hicks
BY
Pearson + Pearson
ATTORNEYS

United States Patent Office 3,460,675
Patented Aug. 12, 1969

3,460,675
SEPTIC TANK INSPECTION APPARATUS
AND PROCESS
Robert M. Hicks, Westford, and Henry A. Anderson,
Townsend, Mass., assignor to Robert M. Hicks, trustee
Filed June 12, 1967, Ser. No. 645,338
Int. Cl. B01d 21/24; B03b 3/38; C02c 1/00
U.S. Cl. 210—83                                    10 Claims

ABSTRACT OF THE DISCLOSURE

A test apparatus for determining whether a septic tank requires pumping out, said test apparatus comprising (1) a removable trap compartment situated between a septic tank and the leach field therefor, and (2) means for removing and inspecting said trap for solid material, said means being operable from and communicating with the surface of the soil in which the septic tank is buried. In preferred embodiments of the invention, the test apparatus comprises height-adjustable inspection means to facilitate installation of the apparatus without necessity for predetermination of the depth to which a septic tank system is buried.

Background of the invention

This invention is related to an apparatus and method for detecting when a septic tank or like sewerage processing facility should be serviced by pumping out or cleaning. Such cleaning action is often required in both industrial and household facilities to prevent solid material from escaping from the tank, penetrating into the leach field area, and destroying or materially reducing the absorbtivity of the field. Such absorbtivity, once destroyed, can only be restored at great cost. Thus an efficient, economical method of determining when a septic tank requires cleaning, without the necessity of digging into the soil and making an inspection of the inside of the tank, is highly desirable.

Efforts have been made to produce such a device, but, by and large, they are not adapted for the economic and technical realities of small-scale units which must be maintained by sewerage service contractors or homeowners. Thus, for example, the devices disclosed in United States Patents No. 2,147,422 to Bendz and No. 1,958,252 to Singleton et al. disclose photoelectric means for detecting and/or controlling the level of sludge in septic-tank type systems. Such systems are not only costly and complicated, but cannot usually sense more than degrees of opacity. Photoelectric devices are not especially suitable to sense the presence of solid material in the effluent of a tank.

It is a principal object of the invention to provide an inexpensive, dependable and easily-operable apparatus for inspection of the effluent of a septic tank.

It is a further object of the invention to provide an inspection-apparatus assembly that can be mass produced but will conform to the requirements of most septic tank systems and will be readily installable for use with such systems.

It is another object of the invention to provide means for quickly determining by visual inspection whether a significant amount of solid matter is escaping from a septic tank.

Other objects of the invention will be obvious from reading the description of the invention hereinbelow.

Summary of invention

These objects have been substantially achieved by providing a test assembly for placement in the fluid-outlet line of a septic tank and comprising a removable receptacle conveniently fitted into a trap-shaped receiving section and a substantially vertical conduit connecting said trap with the ground surface and forming a path through which the trap receptacle can be brought to the surface. The vertical conduit is preferably telescopable and adjustable in height to provide flexibility in adjusting the conduit to the depth of any particular septic tank system. A lift means is attached to the receptacle for lifting it to the surface through the aforesaid vertical conduit. Advantageously this lift means is a stiff, stick-like object, for example a mild steel rod. A rigid rod has been found to be particularly helpful in order to assure the proper seating of the receptacle in the receiving trap. Like the vertical conduit, a length-adjusting feature is a particularly useful feature for the lift means.

If desired, the bottom plate of the receptacle may be apertured to allow the passage of liquid therethrough while retaining solid matter thereon. A receptacle so constructed will normally be free of liquid on arrival at the surface for inspection; therefore no deception will be possible by the appearance of a small quantity of sludge floating on the surface of the receptacle contents.

Figure 1:
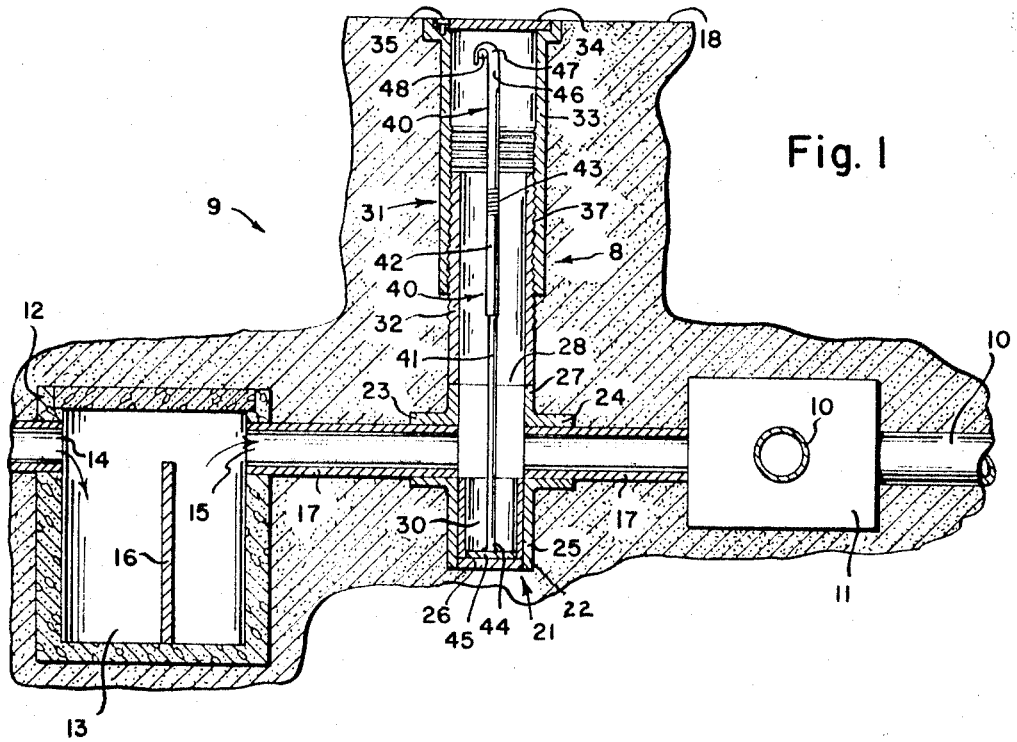
FIGURE 1 is an elevational view in section and partly schematic of the apparatus of the invention situated in place beneath the ground surface and between a septic tank and its leach field.

As shown in the drawing, the inspection apparatus 8 of the invention is intended for use in a typical sewerage system 9 of the type having a leaching field 10, formed of apertured pipe leading from a distributor box 11, and a septic tank 12. The septic tank 12 is usually made of cement or metal and includes the sludge, or sediment chamber 13, an influent inlet 14, and effluent outlet 15, and suitable baffles 16. The outlet 15 is connected by soil pipe 17, underground, to the distributor box 11 and preferably the pipe system is substantially air and liquid tight to form a closed line which does not emit odors. Ground level, or surface is designated 18 and the system 9 is usually at least two feet below ground level.

Figure 2:
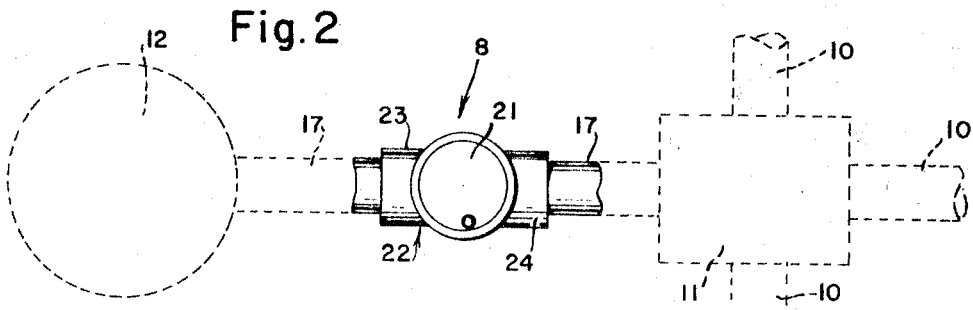
FIGURE 2 is a plan view of the apparatus shown in FIGURE 1.

In this invention, trap means 21 is provided in advance of the leaching field 10 and preferably in rear of the septic tank effluent outlet 15, for example, as shown in FIGURES 1 and 2, intermediate of the length of the effluent discharge soil pipe 17. The trap means 21 is preferably formed by a soil pipe fitting 22 of cruciform configuration, the fitting 22 having a pair of opposite horizontal sections 23 and 24, each connected into line 17, in a manner well known, to form a tight seal. Fitting 22 includes a lower vertical section 25, having a bottom closure 26 and forming a trap for receiving any solid material discharged with the effluent from tank 12 and travelling toward distribution box 11. Fitting 22 also includes the upper vertical section 27 which is open at the top 28.

A receptacle 30 is liftably and removably positioned within the lower section 25 to receive any solid material, and unlike any trap devices known to us, the receptacle 25 is removable upwardly through the upper section 27. The receptacle 30 thus may be used as a sampling means, accessible at will from about ground, in a manner explained hereinafter.

The apparatus of the invention includes a receptacle conduit means 31, extending from the trap means 21 upwardly to ground level 18, and forming an extension of the upper section 27 of fitting 22. Conduit means 31 may be a single pipe of suitable diameter to accommodate receptacle 30, but preferably is formed of a pair of telescopable pipe sections 32 and 33, so that it is adjustable to the depth of line 17 during installation of the system. A suitable closure cap, or plate, 34, held in place by bolts 35 and having a sealing gasket, such as an O ring, is removably mounted on the upper end of conduit means 31. The telescopable pipe sections 32 and 33 may be threadedly connected as at 37 to permit height adjustment while providing an air seal, as shown.

Handle lift means 40 may be formed by a pair of telescopable rods 41 and 42 of rigid material such as metal, the rods 41 and 42 being threadedly connected as at 43 to adjust to the height of conduit means 31. The lower end 44 of means 40 is fixed to the bottom 45 of receptacle 30 and the upper end 46 of means 40 includes a handle grip 47 which may be of hooked configuration to hook over a transverse rod 48.

Figure 3:
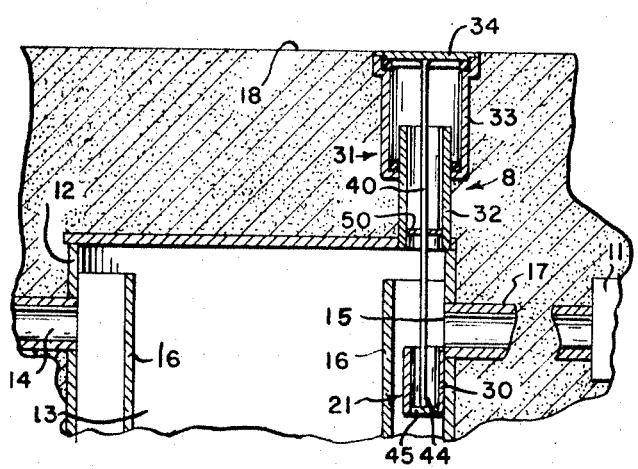
FIGURE 3 is a fragmentary view, similar to FIGURE 1 showing another embodiment of the invention.

As shown in FIGURE 3, the trap means 21 can be mounted close to the septic tank 12 or can be integrally formed therewith if desired. The trap means 21 is formed by the receptacle 30 itself held in place at the outlet 15 at the desired level and location for trapping any solid material about to be discharged with the effluent liquid. Receptacle 30 is suspended by the rigid handle lift means 40, there being one or more spacers 50 to hold it in place. The rod 40 is also fixed to the cover plate 34 which acts as a spacer and is lifted upwardly with the cover plate.

In operation, the householder need merely remove plate 34 and lift out the receptacle 30, at desired intervals, to determine whether any fecal matter or other solids are being discharged with the effluent passing to the leaching bed. If solid material is noted during such visual inspection, or sampling, the septic tank is ready to be cleaned out to avoid permanently fouling the leaching bed.

What is claimed is:

1. Apparatus for determining the presence of solid material in a sewerage system having a septic tank with a sludge chamber and an effluent outlet, at a predetermined level therewithin, leading to a leaching field, said apparatus comprising:
   underground trap means mounted in said system just below the predetermined level of said outlet, in advance of said leaching field for trapping any solid material in said effluent before said material reaches said leaching field, said trap means including a liftable receptacle for receiving said solid material;
   receptacle conduit means extending from the level of said trap means upwardly to ground level, said conduit means including an openable closure at ground level, for providing access to said trap means; and
   handle lift means connected to said receptacle and extending upwardly in said conduit means to proximate the level of said closure, for raising said receptacle to visually inspect the same for solid material.

2. Apparatus as specified in claim 1, wherein:
   said trap means includes a soil pipe connecting said outlet to said leaching field, and
   a soil pipe fitting of cruciform configuration having a pair of opposite horizontal sections connected in said soil pipe, a lower vertical section with a bottom closure forming a trap for containing said receptacle and an upper vertical section forming part of said receptacle conduit means for lifting said receptacle to ground level.

3. Apparatus as specified in claim 1, wherein said receptacle conduit means comprises a pair of telescopable pipe sections adjustable in height relative to each other, and includes means for sealing the telescopable joint between said sections.

4. Apparatus as specified in claim 1, wherein said handle lift means is an elongated rod of rigid material having its lower end fixed to said receptacle and having a handle grip at its upper end.

5. Apparatus for determining the present of solid material in the effluent discharged from a septic tank to a leaching field, said apparatus comprising:
   underground soil pipe means for guiding effluent from said tank to said field, said soil pipe means including an underground trap located in rear of the sludge chamber of said tank and in advance of said leaching field for trapping any solid material in said effluent;
   conduit means extending upwardly from said underground trap to ground level, said conduit means forming part of said soil pipe means, and having an openable closure at ground level; and
   sampling means including a receptacle in said trap for receiving solid material trapped therein, and handle lift means extending upwardly from said receptacle in said conduit means to proximate said openable closure at ground level,
   whereby said closure may be opened and said receptacle lifted by said handle means to ground level for inspection to determine the presence of solid material in said effluent.

6. Apparatus for testing the condition of the effluent of a septic tank buried beneath the surface of the ground, said apparatus comprising:
   (a) a trap receptacle adapted to receive and contain solid material in the effluent of said tank, said receptacle being removably mounted in and below a fluid-outlet line of a septic tank and between said tank and a leach field into which fluid from said tank is to be discharged,
   (b) a substantially vertical conduit extending upwardly from said outlet line to ground surface for providing access to said receptacle, and
   (c) means for vertically removing said receptacle from said line through said conduit to the said ground surface for inspection.

7. The apparatus as defined in claim 6, wherein said vertical conduit consists of a plurality of conduit sections telescopically and threadedly related one to another, thereby providing sealed depth adjustment means for facilitating installation of said apparatus.

8. The apparatus as defined in claim 7, wherein said means for removing said receptacle is a stiff handle having length-adjusting means for facilitating installation of said apparatus.

9. The apparatus as defined in claim 6, wherein said receptacle includes, at the bottom thereof, a screen for draining effluent liquid while retaining solid material thereabove.

10. A process for inspecting a sub-surface septic tank sewerage system by means of a trap receptacle to determine the presence of any solid material in the effluent thereof, said process comprising the steps of
    sealing said trap receptacle in said system in advance of the leach field thereof and in position to receive any solid material in the effluent of said tank;
    collecting any said solid material in said trap receptacle at the sub-surface level of the outlet of said septic tank;
    and bodily lifting said trap receptacle periodically to ground surface level to reveal the presence of any said solid material.

References Cited

UNITED STATES PATENTS 1,396,384  11/1921  Shorb _____ 210—85 X
1,719,419  7/1929  Bennett.

OTHER REFERENCES

Manual of Septic-Tank Practice, U.S. Dept. of Health, Education and Welfare, Bulletin 526, pp. 29–32 relied on. First printed 1957 and reprinted in 1963.

REUBEN FRIEDMAN, Primary Examiner

J. ADEE, Assistant Examiner

U.S. Cl. X.R.

210—93, 170, 532